(12) United States Patent
Rule et al.

(10) Patent No.: US 11,743,370 B2
(45) Date of Patent: Aug. 29, 2023

(54) SYSTEMS, METHODS, AND COMPUTER-ACCESSIBLE MEDIUMS FOR REPRESSING OR TURNING OFF THE READ OF A DIGITAL TAG

(71) Applicant: Capital One Services, LLC, McLean, VA (US)

(72) Inventors: Jeffrey Rule, Chevy Chase, MD (US); Paul Moreton, Glen Allen, VA (US); Wayne Lutz, Fort Washington, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 17/477,307

(22) Filed: Sep. 16, 2021

(65) Prior Publication Data
US 2022/0358299 A1 Nov. 10, 2022

Related U.S. Application Data

(63) Continuation of application No. 16/806,702, filed on Mar. 2, 2020, now Pat. No. 11,153,428.

(51) Int. Cl.
*G06K 7/10* (2006.01)
*H04M 1/72412* (2021.01)
(Continued)

(52) U.S. Cl.
CPC .... *H04M 1/72412* (2021.01); *G06K 7/10366* (2013.01); *H04B 5/0056* (2013.01);
(Continued)

(58) Field of Classification Search
CPC .......................... G06K 7/10366; H04W 88/02
(Continued)

(56) References Cited

U.S. PATENT DOCUMENTS 6,662,020 B1 12/2003 Aaro et al.
7,954,723 B2 6/2011 Charrat
(Continued)

FOREIGN PATENT DOCUMENTS

| EP | 3180868 | 6/2017 |
|----|---------|--------|
| EP | 3582166 | 12/2019 |
| WO | 2013/141635 | 9/2013 |

OTHER PUBLICATIONS

Hall, "Sony Xperia S NFC Xperia SmartTags explained—Pocket-lint", Jan. 26, 2012, retrieved from the Internet: URL: https://www.pocket-lint.com/phonwa/news/sony-mobile/114030-sony-experia-s-nfc-smarttags, pp. 1-7.
(Continued)

*Primary Examiner* — Jamara A Franklin
(74) *Attorney, Agent, or Firm* — Hunton Andrews Kurth LLP

(57) ABSTRACT

An exemplary system, method, and computer-accessible medium can include, for example, storing on a first device a digital tag, the tag configured to be associated with at least one application on a second device, such that receipt of the tag on the second device launches the application on the second device; and emitting from the first device to a second device the digital tag; wherein the application on the second device is configured to launch in a special state when the second device is in at least one state from a pre-determined list of states.

20 Claims, 7 Drawing Sheets

(51) Int. Cl.
*H04W 4/80* (2018.01)
*H04B 5/00* (2006.01)
*H04L 67/00* (2022.01)
*H04W 88/02* (2009.01)

(52) U.S. Cl.
CPC .............. *H04L 67/34* (2013.01); *H04W 4/80* (2018.02); *H04B 5/0031* (2013.01); *H04M 2250/04* (2013.01); *H04W 88/02* (2013.01)

(58) Field of Classification Search
USPC .................................................. 235/375, 379
See application file for complete search history.

(56) References Cited

U.S. PATENT DOCUMENTS

| | | | |
|---|---|---|---|
| 7,962,369 B2 | 6/2011 | Rosenberg | |
| 8,005,426 B2 | 8/2011 | Huomo et al. | |
| 8,233,841 B2 | 7/2012 | Griffin et al. | |
| 8,818,867 B2 | 8/2014 | Baldwin et al. | |
| 9,398,462 B1 * | 7/2016 | Delker | H04W 4/60 |
| 9,767,329 B2 | 9/2017 | Forster | |
| 10,511,443 B1 | 12/2019 | Newman et al. | |
| 10,516,447 B1 | 12/2019 | Rule et al. | |
| 2010/0029202 A1 | 2/2010 | Jolivet et al. | |
| 2011/0294418 A1 | 12/2011 | Chen | |
| 2011/0312271 A1 | 12/2011 | Ma et al. | |
| 2013/0200999 A1 | 8/2013 | Spodak et al. | |
| 2014/0027506 A1 | 1/2014 | Heo et al. | |
| 2020/0106620 A1 | 4/2020 | Newman et al. | |

OTHER PUBLICATIONS

Anonymous, "Unlock Your Device with NFC", Aug. 13, 2013, retrieved from the Internet: URL:https://www xda-developers.com/unlock-youe-device-with-nfc, p. 1.

Profis, "The most practical, creative ways to use NFC with your Android Device", CNet, Jul. 25, 2012, retrieved from the Internet: URL:https://www.cnet.com/how-to/the-most-practical-creative-ways-to-use-nfc-with-your-android-device, pp. 1-4.

Notification of Transmittal of the International Search Report and the Written Opinion of the International Searching Authority issued in PCT/US2021/019406, dated May 11, 2021.

Notification Concerning Transmittal of International Preliminary Report on Patentability from related PCT Application No. PCT/US2021/019406, dated Sep. 15, 2022.

Author Unknown, Possible to Prevent app launch by NFC Intent from within an app?, Sep. 12, 2017 , Retrieved Mar. 2, 2020 from Internet URL: https://stackoverflow.com/questions/46171741/possible-to-prevent-app-launch-by-nfc-intent-from-within-an-app.

* cited by examiner

System 700

SYSTEMS, METHODS, AND COMPUTER-ACCESSIBLE MEDIUMS FOR REPRESSING OR TURNING OFF THE READ OF A DIGITAL TAG

CROSS-REFERENCE TO RELATED APPLICATION

The subject application is a continuation of U.S. patent application Ser. No. 16/806,702, filed Mar. 2, 2020, the complete disclosure of which is incorporated herein by reference in its entirety.

FIELD OF THE DISCLOSURE

The present disclosure relates generally to repressing or turning off the read of a digital tag, such as an NFC tag, by a user device, such as a smartphone (e.g. an iPhone® or Android® phone).

BACKGROUND INFORMATION

Near-field communication (NFC) enabled devices, such as smartcards and other devices, have become ubiquitous and continue to increase in popularity. Similarly, smartphones have also become more and more popular in recent years. Data contained on an NFC-enabled smartcard can be read when an NFC field is brought sufficiently close to the NFC smartcard. This energizes the NFC components on the smartcard and allows for information to be read from the smartcard. Many smartcards are configured to allow access to the encoded information by any suitable receiving device. This can lead to security problems, particularly in the context of a mobile device capable of reading data from a contactless chip. Mobile devices configured with, for example, an NFC reader are capable of reading credit card information from a card chip. This can allow the mobile device to read the information on the card whenever the credit card is within the range of the NFC field of the mobile device.

Certain operating systems are configured to cause a smartphone or other device to continuously operate its NFC field, allowing the smartphone to read any NFC smartcards that are brought close to the smartphone. As an example, devices operating the Android® operating system by Google® are configured to have an NFC field which is constantly active. This can result in unintentional reads of NFC-enabled smartcards when the smartcard is brought close to it. For example, when NFC-enabled cards are placed in a user's pocket together, or when an adhesive wallet which is attached to the back of a phone to store cards is used, smartcards can be read by a device which the user does not intend for the smartphone, or other device, to read the information contained on the smartphone or other device.

In other cases, the smartphone may, responsive to receipt of the NFC tag, launch an application or perform another action. This can be contrary to a smooth user experience in use of the smartphone as the user may not wish that an inadvertent tap of a smartcard launch an application. In other cases, due to being in close proximity when carried by a user (such as in a user's wallet), multiple NFC tags might be read, causing more than one application to be launched, or actions taken, without the user intending for these actions to be performed. Simultaneously, a user may not wish to disable the NFC capabilities of his or her device due to the convenience of using an NFC-enabled smartphone and NFC-enabled devices.

In yet other cases, a counter on a smartcard can increment each time the NFC-enabled smartcard is read. However, the counter may not necessarily correspond to an independent counter maintained at the issuer of the smartcard. The reason for the difference in correspondence can occur because, for example, the counter on the smartcard may be incremented each time the smartcard is read, but the read or information being read from the smartcard may not be sent to the issuer of the smartcard. This difference can lead to security issues when the two counters are not synchronized. Accordingly, there is a need to maintain synchronization of the counter on the NFC-enabled smartcard without disabling the NFC capabilities of the smartcard.

Conventional methods related to NFC and the near-field data exchange format (NDEF) have limitations that do not allow for the functionality of an NFC tag to launch an application, prevent unintentional launches, and/or allow for a user to toggle the functionality of, for example, an NFC smartcard. These are other deficiencies exist. Thus, it can be beneficial to provide exemplary systems, methods, and computer-accessible mediums that selectively repress or turn off the read of an NFC tag by a smartphone. It can be further beneficial to provide exemplary systems, methods, and computer-accessible mediums to toggle the functionality of repressing or turning off the read, or launching of an application responsive to the read of an NFC tag, by a smartphone. Even further, it can be beneficial to provide exemplary systems, methods, and computer-accessible mediums, which can synchronize (and/or maintain the synchronization of) the counters on the smartcard and the issuer of the smartcard.

SUMMARY OF EXEMPLARY EMBODIMENTS

Embodiments of the present disclosure provide a system, method, and computer-accessible medium, which can include, for example storing on a first device a digital tag, the tag configured to be associated with at least one application on a second device, such that receipt of the tag on the second device launches the application on the second device; and emitting from the first device to a second device the digital tag; wherein the application on the second device is configured to launch in a special state when the second device is in at least one state from a pre-determined list of states.

Embodiments of the present disclosure provide a system, method, and computer-accessible medium, which can further include, for example: receiving from a first device digital information upon physical proximity with the first device; receiving from the first device a digital tag configured to be associated with an application; launching, responsive to the tag, the application associated with the received digital tag; and for a fixed time duration after the receipt of the digital tag, through the application, intercepting additional digital information from the first device when the computer hardware arrangement is in at least one state from a pre-determined list of states.

Embodiments of the present disclosure provide a system, method, and computer-accessible medium, which can further include, for example: emitting from the first device a digital tag, wherein the tag is configured to be in the near-field communication data exchange format specification, further configured to be an Android Application Record launch tag and further configured to be associated with at least one application on a second device, such that receipt of the tag on the second device launches the application, wherein the application is configured to intercept additional information emitted from the first device within a fixed time period when the second device is in at least one state from a pre-determined list of states.

Further features of the disclosed design, and the advantages offered thereby, are explained in greater detail hereinafter with reference to specific example embodiments illustrated in the accompanying drawings.

DETAILED DESCRIPTION OF EXAMPLE EMBODIMENTS

Figure 1:
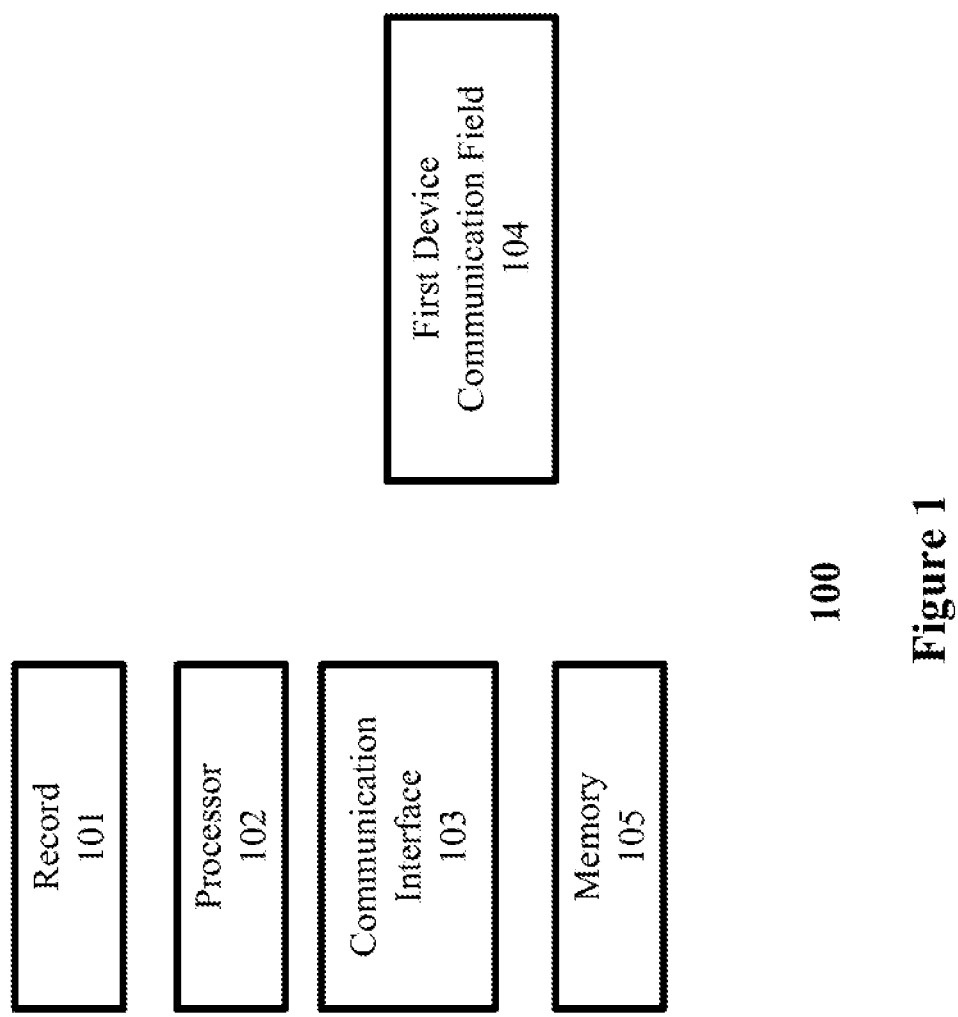
FIG. 1 is a diagram illustrating a first device according to an example embodiment of the present disclosure.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

An example system, method, and computer-accessible medium can be provided which can facilitate the blocking or repressing of a device of the read of information contained on a smartcard by for example a computer or smartphone. The smartphone can be an Android® phone, but any smartphone having the functionality described in this disclosure is within the scope of the invention.

A smartcard can be for example, an identity card, which can be read by a mobile device. For example, information encoded on a user's smartcard can be read by a mobile device, or other similar device, upon physical proximity of the smartcard to the device. A smartcard is often encoded to provide digital information to the device without any configuration—accordingly, the information on the card can be read by any piece of software installed on the digital device. However, a smartcard can be encoded to include, for example, a digital tag. When the smartcard is in proximity to a device, the digital tag can first be read by the mobile device. Generally, upon receipt of the digital tag, an application identified by the digital tag, or otherwise configured to be associated with the payload in the digital tag, is launched automatically.

The digital tag can be configured to, when read by a mobile device, first launch an application identified by the digital tag. An application is typically launched responsive to receipt of a digital tag. In addition, and if necessary, the digital tag can be configured to prompt the mobile device to download and install an application prior to launching it. In some examples, the digital tag can be configured to cause the mobile device to launch the application store associated with operating system running on the mobile device (e.g., the Google® Play Store for Android® devices) to facilitate the download and installation of the application.

In some examples, the mobile device can continuously monitor for the receipt of digital tag(s) on the mobile device. The mobile device can further contain a background service that can continuously monitor or otherwise capture information about the state of the mobile device. In some examples, the background service can be part of the application identified by the digital tag. Upon receipt of the digital tag by the mobile device and in combination with information about the state of the mobile device collected by the background service (e.g. whether the screen is on, whether the device is locked/unlocked, whether the power saver is on/off, what applications are running, what tasks are pending completion, whether a communication interface is engaged/disengaged, whether or not the device is awaiting a user input, whether the processor is operating above or below a certain level, whether the battery is above or below a certain level, or if the target application has already been launched or is engaged in a task), the mobile device can launch the application associated with the digital tag into a non-visible state. For example, if the digital tag is read within a threshold time after the mobile device screen unlocks (e.g., within 100 milliseconds, within 200 milliseconds, or within 400 milliseconds), the monitoring application can determine this to be an inadvertent read and thus, the application would not be launched. Inadvertent reads of digital tags can be caused for a number of reasons, including without limitation, including proximity to an emitting device and the activation of the mobile device's radio receiver when its screen is unlocked by a user.

Further, if the mobile device detects another tap or receipt of the same digital tag within a predetermined period of time, the mobile device can then launch the application associated with the digital tag in a visible state for the user to interact with. In addition, if the application is launched into a non-visible state responsive to receipt of the digital tag, the mobile device can also read additional information from the manifest of multiple tags stored on a smartcard, and send the payload of such tags to a web service. If an additional read of a digital tag is not present within a pre-determined period of time, the application can exit, without the user of the device ever seeing an interface.

An application can also be configured to, either automatically or based on user input or preferences, write to an applet located on a smartcard which is compliant with JavaCard®, or another smartcard operating system. An applet on the smartcard will generally generate an NFC compatible tag, such as an NDEF tag, whenever the smartcard is powered by the field of the smartphone. The application can thus toggle the functionality of the smartcard to turn off the creation of NFC tags, or otherwise modify the smartcard, so that a user can choose whether he wants the smartcard's NFC functionality to be enabled or disabled.

The launched application can for example be configured to prevent other applications on the smartphone device from accessing the requested information. The application associated with the digital tag can be installed on the device by the user. The tag can be generated in the NDEF data format specification. The NDEF tag can further be configured as an Android® Application Record (AAR) launch tag.

The application associated with the digital tag can further be configured to perform a variety of functions. For instance, the application can send a notification to a user when the application has been launched more than a pre-determined number of times in a pre-determined period of time. The application can also create a list of other applications installed on the device. Any other functionality generally associated with an application on an operating system, such as for example, an application on the Android® operating system, can be programmed into the device.

FIG. 1 is a diagram illustrating a first device 100. The first device can be any device capable of storing information such that the stored information can be accessed. First device 100 can be capable of storing a record 101. The first device can also have a processor 102. Processor 102 can be any suitable commercially available or custom designed processing circuitry. The first device can also have a communication interface 103 capable of generating a first device communication field 104. The first device can also have memory 105. The first device 100 can be any device capable of containing a record 101 and able to communicate through a communication interface 103, including a payment card, credit card, a debit card, a user identity card, a cell phone, a smart phone, an RFID card, a tablet, a computer, an NFC card, or any other communication device. It is understood that the present disclosure is not limited to a particular type of card or first device, and includes any type of card or first device capable of performing the functions described herein.

The first device 100 can also be a smartcard, with any suitable smartcard operating system stored on the first device 100. For example, the operating system can be stored on memory 105. The card operating system can be run using the processor 102 of first device 100. Two examples of operating systems available for smart cards include JavaCard® and the MULTOS Card Operating System®. Card operating systems can allow for the on-card application development of programs that need to run within the secure environment of the smart card chip—such as for example, chip enablement, issuance, controlling files, and managing data loads. Specific applications can be installed on the card operating system to for example, generate NDEF tags that follow certain specified parameters. These generated tags can be stored in record 101.

Record 101 can include any information that is accessible by a suitable computing device. Record 101 can be stored within memory 105. Record 101 can be stored in any suitable data type, including Boolean, byte, cbyte, date, decimal, integer, long, number, string, or any combination of those data types. Record 101 can also be stored as delimited, fixed, or mixed data. Record 101 can contain multiple pieces of data, which all can have corresponding meta-data. The records can also include custom data types or data fields. Non-limiting examples of data can include information such as the first device's identifier number, a credit card number, a personal account number (PAN), a user name associated with the first device, an expiration date for the first device, and a card verification value (CVV) code.

Record 101 can also be stored in a manner to allow for data to be exchanged over the NFC Data Exchange Format (NDEF), which allows for the exchange of information between any compatible NFC device and another NFC device or tag. NDEF is strictly a message format. It is a binary message encapsulation format to allow for the exchange between NFC-enabled devices. NDEF messages can contain payloads of arbitrary type and size. The NDEF data format can store be used to store and exchange information such as Uniform Resource Identifier (URIs), plain text, etc., using a format that is commonly understood. The NDEF data format further can further support the exchange of NDEF messages as a mechanism to allow for the exchange of NDEF records. Each NDEF record can contain a structure that identifies the content of the record as well as the size of the record. An NDEF record can contain on a basic level two components, a record type used to provide context to a payload data and a payload data. Together, these two components represent the action to be taken by a device upon receipt of an NDEF record. One NDEF message can contain more than one NDEF record. The NDEF file itself can be created dynamically. For example, the NDEF file can be based on a random number generator or externally introduced data. An NDEF file is read when a card, or a chip contained in the card is exposed to a properly aligned magnetic field and a request is issued for a specific NDEF message.

Record 101 can further be stored as an AAR launch tag. An AAR launch tag is a special type of NDEF record, which is used by Google's Android® operating system, to signify to an NFC device that an explicitly defined Android® Application should be used to handle the NFC tag. An AAR launch tag can include a package attribute, which can identify which Android® application will handle or process the NFC tag. The package attribute can identify which Android® application will be launched in response to the tag.

Record 101 can also be stored in a format compatible with the iOS operating system framework. For example, the iOS operating system allows for the use of the Core NFC library to allow for Near Field Communication (NFC) tags of types 1 through 5 to be read, which contain data in the NFC Data Exchange Format.

Memory 105 can be a read-only memory, write-once read-multiple memory or read/write memory, e.g., RAM, ROM and EEPROM, and a first device 100 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. The read/write memory can also be read many times. The memory of user device 200 can be programmed with instructions to generate a record 101. Record 101 can further include digital tags, which can be generated based on instructions included in memory 105. The memory of user device 200 can also include instructions stored as specialized applets, such as a JavaCard® applet. For example, memory 105 can generate one or more NDEF tags, which can further be configured to be AAR NDEF records associated with a particular Android® application. Memory 105 can thus advantageously be modified if needed to change which Android® application on an Android® device responsive to receipt of a tag. In another example, memory 105 can be configured to generate a digital tag which is configured to be compatible with a different operating system or different application.

Memory 105 can store other information, such a user identifier. Record 101 can also be included in memory 105. A user identifier, algorithms, other information such as cryptographic keys can also be stored in memory 105. Memory 105 can be divided into several zones, with each zone having a different level of security. The processor 102 can keep track of which memory addresses belong to which zones and the circumstances under which each zone can be accessed. In an example embodiment, the memory 102 can be divided into four zones: a secret zone, a confidential zone, a usage zone, and a public zone.

A secret zone can be used for storage of information which can be used only by processor 102, e.g., passwords, cryptographic keys. The information stored in this zone is not readable outside of the first device 101. The zone can also contain a dynamic algorithm which determines the tags that can be sent by a transfer device. In an example, the secret zone can be implemented with a separate processor that is capable of performing cryptographic functions. Cryptographic keys can be passed in to the secret zone or can be generated in the secret zone, and in either case the keys can be stored in the secret zone and used to support cryptographic services. If necessary, cryptographic keys can be exported from the secret zone. Cryptographic keys and passwords can also be stored directly in memory 105 without the use of a secret zone.

Communication interface 103 can be of any suitable technology capable of sending or receiving data over a distance Examples of such technology include, for example, Wi-Fi, WLAN, RF, radio, IR, Bluetooth, RFID, NFC or any combination thereof or any other appropriate architecture or system that facilitates the communication of signals, data, and/or messages. Similarly, any suitable hardware level and software level algorithm can be chosen to allow for the transfer of data on a first device communication field 104. The first device communication field 104 can be generated by communication interface 103 using one or more communication protocols, including the asynchronous connection-less protocol, synchronous connection-oriented link, link management protocol, host controller interface, or low energy link layer. Information can be communicated using the NDEF data exchange format. The use of this format allows for the exchange of both NDEF messages and NDEF records. The NDEF data format can support NDEF messages that are a mechanism allowing for the exchange of NDEF records. Each NDEF record can contain a structure that identifies the content of the record as well as the size of the record. An NDEF record can contain two components, a payload data and a record type used to provide context to the payload data. Together, these two components represent the action to be taken by a device upon receipt of an NDEF record.

Figure 2:
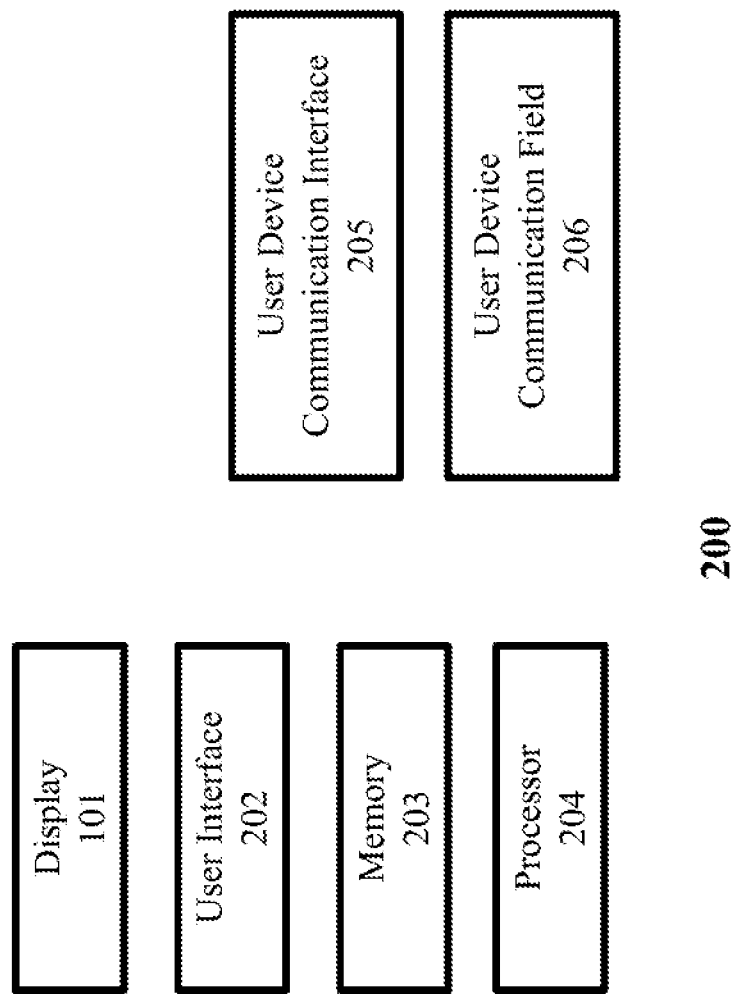
FIG. 2 is a diagram illustrating a user device according to an example embodiment of the present disclosure.

FIG. 2 is a diagram illustrating a user device 200. Non-limiting examples of user device 200 include any NFC reading device, such as a personal computer, a laptop, a tablet, a cell phone, an NFC reader, or a smart phone. It is understood that the present disclosure is not limited to a particular type of user device, and includes any type of user device capable of performing the functions described herein. User device 200 can include a display 201, a user interface 202, memory 203, a processor 204, and a user device communication interface 205 with a user device communication field 206. User device 200 can further be configured to contain one or more operating systems, such as for example, the Android® operating system.

Memory 203 can be a read-only memory, write-once read-multiple memory or read/write memory, e.g., RAM, ROM and EEPROM, and a user device 200 can include one or more of these memories. A read-only memory can be factory programmable as read-only or one-time programmable. One-time programmability provides the opportunity to write once then read many times. A write once/read-multiple memory can be programmed at a point in time after the memory chip has left the factory. Once the memory is programmed, it cannot be rewritten, but it can be read many times. A read/write memory can be programmed and re-programed many times after leaving the factory. It can also be read many times.

Memory 203 can further be configured to be installed with an operating system or special instructions. The installed operating system can further be configured to install additional compatible pieces of software, such as applications or programs. Examples of commercial operating systems include for example the Android® operating system, iOS®, Windows®, Debian®, Linux®, and Linux® variations such as Ubuntu®. Special purpose operating systems can also be installed on memory 203. As another example, more than one operating system can be installed on memory 203, allowing a user of the user device 200 to select which operating system the user wishes to use.

Display 201 can be selected from any suitable two-dimensional or three-dimensional display, such as a light-emitting diode, liquid crystal display, digital light processing display, or organic light-emitting diode display. User interface 202 can be selected from any suitable user input device such as a touchpad, a touchscreen, a mechanical switch, natural language user interface, a click-wheel, QWERTY keyboard, mouse, gesture recognition, or capacitive touchscreen.

User device communication interface 205 can be of any suitable technology capable of sending or receiving data over a distance. Examples of such technology include, for example, Wi-Fi, WLAN, RF, radio, IR, Bluetooth, RFID, Near-Field-Communication (NFC) or any combination thereof or any other appropriate architecture or system that facilitates the communication of signals, data, and/or messages. Similarly, any suitable hardware level and software level algorithm can be chosen to allow for the transfer of data on user device communication field 206. User device communication field 206 can be generated by user device communication interface 205. Examples of algorithms include the asynchronous connection-less protocol, synchronous connection-oriented link, link management protocol, host controller interface, or low energy link layer. Information can be communicated using the NDEF data exchange format. The use of this format allows for the exchange of both NDEF messages and NDEF records. The NDEF data format can support NDEF messages that are a mechanism allowing for the exchange of NDEF records.

First device 100 and user device 200 can also communicate with one another using a network. Network can be any means, mechanism, protocol, or pathway to allow information to be transferred between the first device 103 and user device 200 including but not limited to Wi-Fi, WLAN, RF, radio, IR, Bluetooth, cellular, near-field communication, SMS, MMS, a phone call, any combination thereof, or any other suitable architecture or system that facilitates the communication of signals, data, and/or messages. The first device and the user device can be in communication through a single network or a multitude of networks.

In an example embodiment, first device 100 can become energized when it comes close to an NFC reader which can be contained on user device 200. The NFC reader can emit a magnetic field which can energize first device 100 (e.g. a smartcard) through inductance. The first device 100 (e.g. a smartcard) can also generate a manifest of tags through stored programming, such as an applet, which dynamically generates NFC tags, such as a random number. The first device, once powered, through this or another method, can then emit an NFC signal. Upon detecting the NFC signal emitted by first device 100, user device 200 can automatically attempt to read an NDEF message by sending an NDEF request to first device 100. First device 100 can accept the request from user device 200 and respond with an NDEF message. The NDEF message can further contain at least one record that is an AAR launch tag.

Upon first device 100 and user device 200 being within physical proximity of each other, the user device can request information from the first device. The first device can in response to the request, transfer the request to user device 200. The first device can also be configured to emit information automatically to any user device 200 capable of receiving information from first device 100. This can be done, for example, when first device communication field 104 overlaps with user device communication field 206. This transfer of information between the first device and the user device can be accomplished through the means described above.

The first device can be configured to include for example, information such as a credit card number, and associated information, such as the CVV number, user name, and expiration date. This first device 100 can further be configured to transfer this information to user device 200 through the use of NFC, or a similar medium. This information can be accessed by any second device upon physical proximity of the two devices. As explained above, upon receipt of the NFC tag, an application installed or otherwise associated with the NFC tag, can be launched by user device 200. The application will typically be launched in a visible mode on user device 200, with full interactivity. The inadvertent launch of one or more applications can interfere with a user's intended use of the NFC functionality of a first device 100 and user device 200.

However, user device 200 can further be configured to include a background service. This background service can be installed in tandem with the installation of the application associated with a tag emitted from first device 100. In some examples, the background service can be part of the application associated with the tag emitted from the first device 100. The background service installed on user device 200 can monitor for the state in which user device 200 is in. For example, the background service can monitor for the state of the device, such as whether the device screen is active, the screen is locked or unlocked, the battery or power of the device, and timing between certain actions (e.g., a time threshold between screen unlock and tag read). The background service can also monitor for whether the application associated with the digital tag has already been launched. Upon receipt of a digital tag, the mobile device, upon detecting the tag associated with an application, and upon review of the appropriate state of the device as collected by the background service, can cause an application associated with the received digital tag to be launched. The background service can then cause the launch of an application associated with the digital tag received by user device 200 in a special state, such as a non-visible state, where the user cannot see or interact with the interface of the application. Thus, the user is not hindered by the launch of an application when he or she does not intend for that application to be launched.

As an example, the background service can act to stop the launch of the application when the user device 200 is within communicating proximity with the first device 100 and a digital tag is read by the user device 200. The state where the user device 200 screen is locked and the application is launched upon a reading of the digital tag can be considered undesirable, in contrast to the state where a user has intentionally caused the user device 200 to read the digital tag. The background service can monitor the time difference between the screen of user device 200 unlocking and the read of the digital tag by user device 200 and compare this difference to a threshold. If the difference is less than the threshold (i.e., if the time between the screen unlock and the tag read is too small) then the launch of the application can be stopped. If the difference is greater than the threshold (i.e., if the time between the screen unlock and the tag read is sufficiently large) then the launch of the application can proceed.

As a further example, the background service can monitor and track the time every time a certain event occurs, such as for example, a user unlocking the screen of user device 200. Thereafter, the background service can record the time at which a digital tag, such as an NFC tag, is received on user device 200. The background service can then compare the two times, and if the times are within a threshold, such as for example, a short period of 200 milliseconds, the background service can be configured not to launch the application associated with the NFC tag in a visible state, and rather launch the application in a non-visible state. In this state, other information received by user device 200, such as for example, the remainder of the payload encoded in an NDEF format, can be stored in memory or storage by user device 200. This information can then be read by the application (which is still in a non-visible state) and acted upon. For example, this information can be sent to a web service. This feature can be advantageously used to synchronize the read count between a smartcard (e.g. first device 100) and an entity issuing the smartcard (e.g. an agency, bank, or other entity).

In another example, a time tracking can be utilized as a guard against execution of the payload. For example, the background service can start to record the time after an event, e.g., powering on the user device 200 or a user unlocking the screen of the user device 200, and the background service can prevent the execution of NDEF payload for a threshold period of time, e.g., 10 seconds, from the time of the event. As another example, the time tracking can commence upon receipt of a digital tag by the user device 200.

In another embodiment, first device 100 can further be configured to include a tag in its record 101, such as an AAR launch tag, appended to the information typically sent by the first device. The AAR launch tag can be configured to, once received by the user device, launch an application specified by the AAR launch tag. This tag can be configured to first be sent to user device 200, before any other tag contained in first device 100 is transferred. This application can be configured to only allow an application associated with a second tag to be launched when the first tag and the second tag are received by user device 200 within or outside a pre-determined period of time. For example, a typical period of a 100 milliseconds can be used, which may correspond to typical human reaction time in tapping a card to a user device. If a same pair of tags are received within this period, it is likely that the card is within proximity of the device (such as on a wallet attached to the phone) and that the user did not intend for the user device to respond to the tag.

However, if the period of receiving the tags is within a certain time frame, the background service or application can allow the application to be launched in its full state, which is visible to the user of user device 200.

First device 100 can also be configured to include or generate a collection of tags, to allow for this process of launching an application to be compatible across operating systems and user devices.

As another example embodiment, an NFC tag contained on a smartcard (e.g. first device 100) can be selectively toggled or turned on or off by a user that has a user device (e.g. user device 200). As an example, user device 200 can contain an application which is able to write to first device 100 through any of the communication methods described above. For example, user device 200 can communicate with first device 100 through NFC. User device 200 can contain an application which allows the user of user device 200 to toggle (that is, turn on or off, or modify the behavior of) of the signals sent from first device 100. This can be accomplished, for example, by an application on the user device which displays the NFC options that are contained on a particular smartcard. For example, the application can display the name of the smartcard, some identifying information about the smartcard (such as for example the issuer of the smartcard, the name on a smartcard, or a number on the smartcard) along with the digital tags that a user may wish to turn on or off. The application can, through the use of NFC or other communication medium on user device 200, then communicate with, and in turn write to the memory of first device 100. The application can then, for example, write to an applet that is located on, for example, a JavaCard® compliant card. By writing to or otherwise modifying this applet, the applet contained on first device 100 can be modified to not generate an NFC compatible tag, such as an NDEF message, whenever the first device 100 is energized by user device 200, through for example, a magnetic field. The application on user device 200 can accomplish this by writing to the applet on the smartcard disabling the functionality that generates the tag. In some examples, the determination to turn on or turn off reading of the tag can be done for security purposes and based on, e.g., the state of the device, location data, time, and/or other criteria.

Additional information to verify that only an authorized change is being made to the first device 100 can include security algorithms on either or both user device 200, the application, and first device 100. For example, a secret code or hash can be sent between first device 100 and user device 200 when such a change is attempted.

As an example, a user may keep their smartcard (such as first device 100) to the back of their Android® phone (such as user device 200) or store their card in a phone wallet immediately adjacent to the phone's NFC reader. An application may be installed on the phone that has been programmed to read an Europay®, MasterCard®, and Visa® ("EMV") applet on the card could read the credit card number, personal information, CVV code and expiration date from the card. In addition to this, the NFC reader, upon receiving a digital tag, such as for example, an NDEF record, or an AAR launch tag, can launch an application.

The addition of the NDEF records to the smartcard does not prevent applications that have already been launched by the user on user device 200 from accessing or requesting information on the first device 100. Applications on the Android® operating system can be automatically launched in the presence of events, such as the presence of an NFC signal. When no application is active on user device 200 however, the NDEF record ensures that the first party application is launched on user device 200 responsive to receipt of the NDEF tag. The Android® operating system is configured to only allow one application to access information from an NFC signal at a time. This can occur when, for example, user device 200 is in a locked state, or when the screen of user device 200 is inactive. However, when an application is already launched by the user of user device 200 is not inhibited from accessing or using that application in the manner intended by the user.

As an example, a user can have his or her NFC-enabled card in his or her purse or wallet. Throughout the course of the day, the enabled card can come into proximity with the user's personal user device, or with other NFC-enabled user devices, such that the card can be energized and read. For example, the user can have a device with the Android® operating system installed on his or her device. The first device can further be configured to include a tag in its record 101, such as an AAR launch tag, configured to launch for example, a Capital One® application on the Android® phone. If the application is not already installed on the device, the tag can further be configured for the Android® phone to launch the Google® Play Store, or another similar platform, to allow for the designated application to be installed.

The NDEF tag or AAR launch tag is configured with the package name of a specific Android® application. Thus, upon receipt of the particular AAR launch tag or NDEF tag, the operating system, or the Android® operating system, will launch the specified application when the contactless card is tapped to the phone. If the specified application is not currently installed on the Android® device, it may cause the Google® Play Store to be launched to the page where the specified application can be downloaded and installed onto the Android® device.

The tag in the first device 100, can further be configured to cause the second device 200 to access a server to download the application associated with the tag in first device 100. This can be accomplished by including information identifying the particular application in the first device 100. The server can be a standard server well-known and commercially in use to communicate over a network with a device. In one example, the tag in the first device can cause a specialized application to interface with the server and cause the application to be downloaded. One example of such a specialized application is the Google® Play Store on Android® operating system. Other examples of such applications include the App Store on the iOS operating system and the Microsoft Store allowing Windows® applications to be downloaded. Yet another example is the Canonical Store and the Ubuntu Software Center on the Ubuntu® operating system. Other specialized package managers exist for various operating systems.

In an example embodiment, a backend service can be informed of each read of the EMV chip contained in first device 100 or of each NFC read. This can occur through the application associated with a digital tag emitted from first device 100 reading the payload when launched in a non-visible state. In this manner, the provider of the first device 100, such as the provider of a smartcard or credit card, can be made aware each particular use of the first device 100. For example, a credit card provider can be informed of each read of the EMV chip. Thus, the credit card provider could match information of each read of the EMV chip with that of known payments made by the customer. In this manner, the credit card provider could use the comparison for fraud protection. In another example, the issuer of a smartcard can be made aware of each read from the EMV chip, and compare each known read of the EMV chip with all attempts to access the information contained in the EMV chip. This information can be used to collectively synchronize a counter on a smartcard such as the first device and a backend service.

Figure 3:
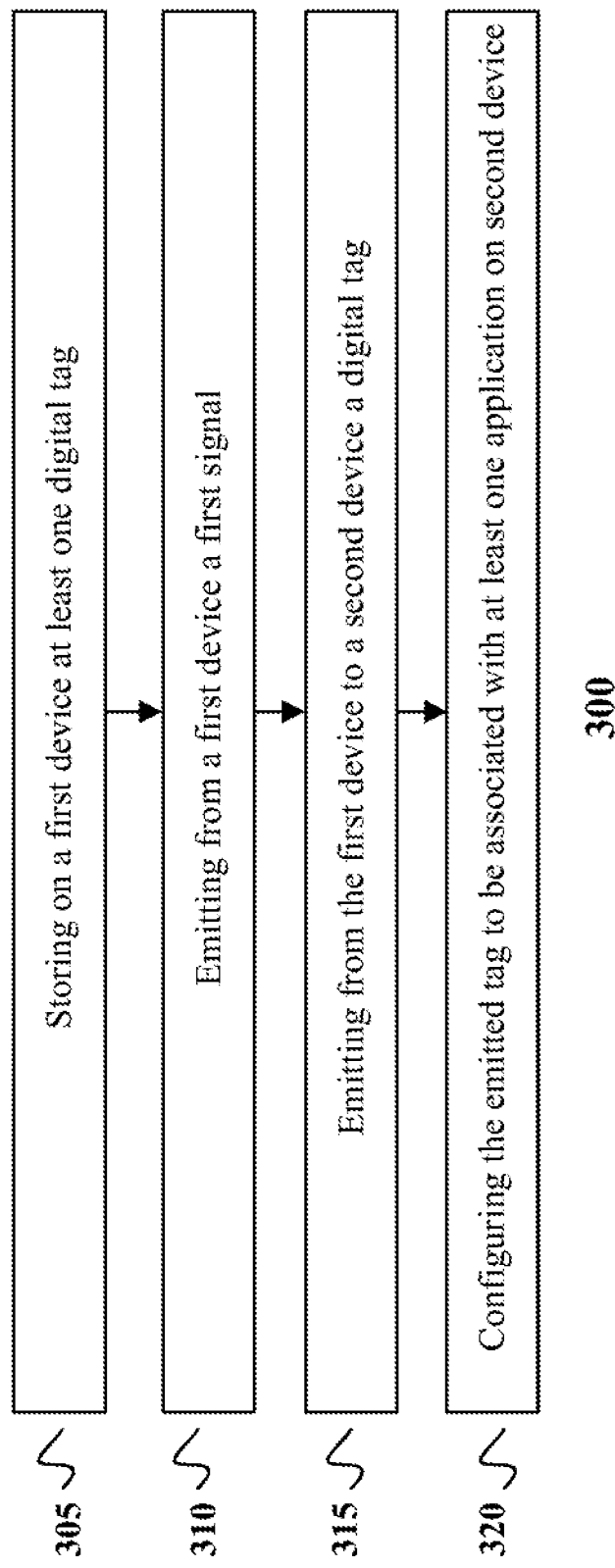
FIG. 3 is a flow diagram of a method for launching an application on a device according to an example embodiment of the present disclosure.

FIG. 3 is a flow chart diagramming a method 300 of transferring information from first device 100 to user device 200 in an example embodiment of the present invention. The method commences at step 305, in which an applet or digital tag is stored on a first device 100. This applet can be configured to generate a collection or manifest of digital tags. These tags can be pre-generated, in which case, an applet can optionally not be used to generate the digital tags. In step 310, a signal is emitted from the first device. This can be emitted in response to an external trigger, such as an electronic field, or first device 100 can be in a state of constant emission of the signal. First device 100 can receive a request for information. This step can for example take the form of the NFC apparatus in first device 100 being activated in the presence of an external field or device. This can also occur when first device communication field 104 overlaps with another communication field. For example, an NDEF file is read when the card/chip is exposed to a properly aligned magnetic field and a request is issued for a specific NDEF message. In step 315, first device 100 can emit a digital tag. In this step, first device 100 can transmit additional information along with the digital tag. Examples of additional information sent along with the digital tag can include user information or credit card information. In step 320, the emitted tag can be configured in such a manner that the emitted tag can be associated with at least one of an application such that receipt of the emitted tag on the second device launches the associated application on the second device. The tag can also be further configured to be associated with an input on the second device. An input can also be a particular state of a user device (e.g. user device 200) in which the device is in a particular state, such as the user device being unlocked, the screen of the user device being active, or the screen being touched. The configuration of the tag can also be done in a manner which corresponds with the NDEF format or the AAR format. The AAR format is compatible with Android® operating system devices and can specify a particular action for the Android® operating system to take upon receipt of the AAR launch tag. For example, it can specify a particular application to launch in response to the received tag.

Figure 4:
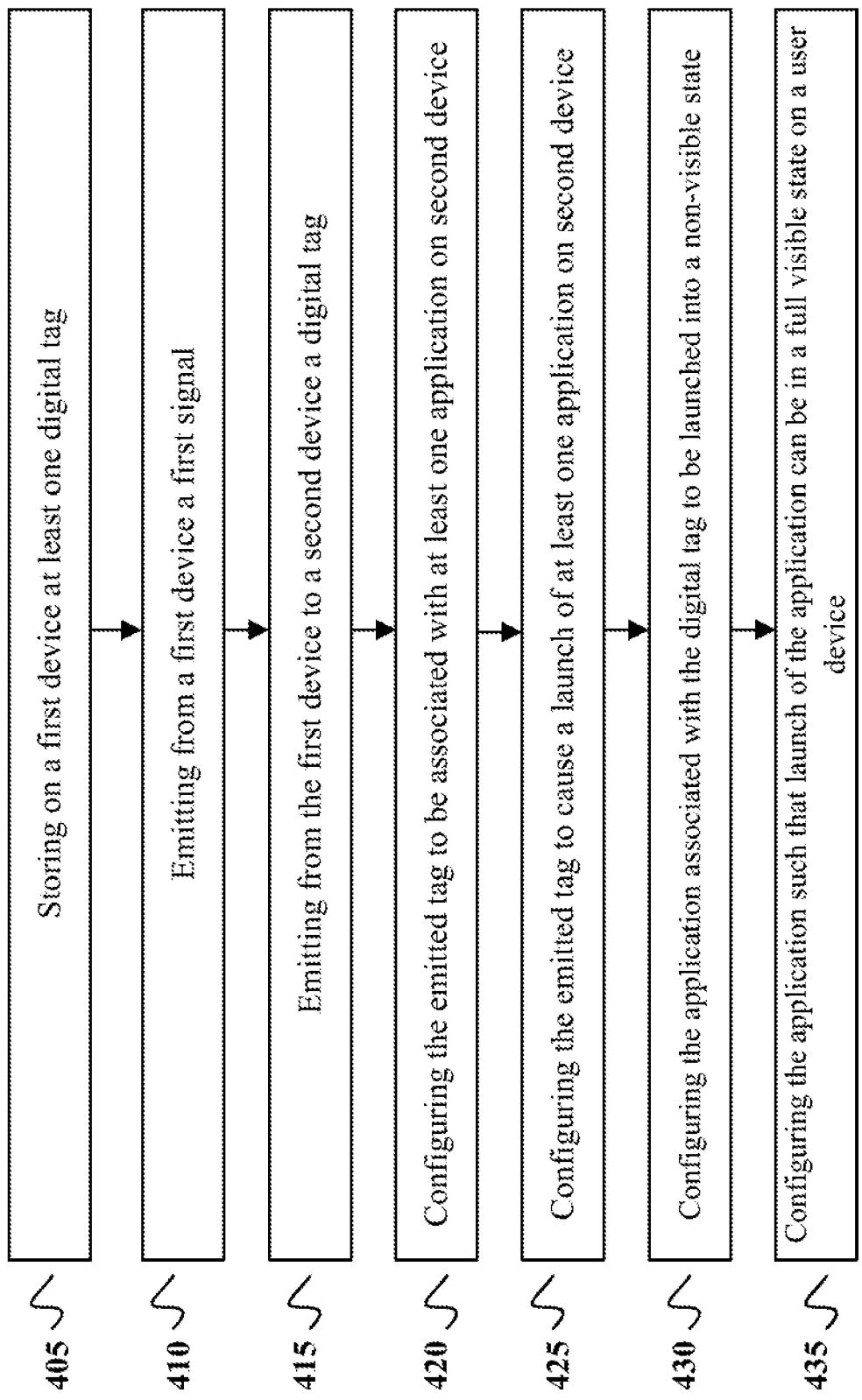
FIG. 4 is a flow diagram of a method for launching an application on a device and synchronizing counters according to an example embodiment of the present disclosure.

FIG. 4 describes one embodiment of the present invention, method 400. The method commences at step 405, in which an applet or digital tag is stored on a first device 100. This applet can be configured to generate a collection or manifest of digital tags. These tags can be pre-generated, in which case, an applet can optionally not be used to generate the digital tags. In step 410, a signal is emitted from the first device. This can be emitted in response to an external trigger, such as an electromagnetic field, or first device 100 can be in a state of constant emission of the signal. First device 100 can receive a request for information. This step can for example take the form of the NFC apparatus in first device 100 being activated in the presence of an external field or device. This can also occur when first device communication field 104 overlaps with another communication field. For example, an NDEF file is read when the card/chip is exposed to a properly aligned magnetic field and a request is issued for a specific NDEF message. In step 415, first device 100 can emit a digital tag. In this step, first device 100 can transmit additional information along with the digital tag. Examples of additional information sent along with the digital tag can include user information or credit card information. In step 420, the emitted tag can be configured in such a manner that the emitted tag can be associated with at least one of an application such that receipt of the emitted tag on the second device launches the associated application on the second device. The tag can also be further configured to be associated with an input on the second device. An input can also be a particular state of a user device (e.g. user device 200) in which the device is in a particular state, such as the user device being unlocked, the screen of the user device being active, or the screen being touched. In step 425, the emitted tag can be configured to launch an application on the second device. This application can be launched for example when the emitted tag is received, and the payload processed by a user device (e.g. user device 200) which in turn causes the application to be launched on the user device. In this step, a background service can record, for example if the screen is on or off, and based on that, and/or receipt of the emitted tag, start a counter. For example, a background service can record the time when the screen of the user device is turned on. However, the background service need not be started at this step and can be started independently of this step. Step 430 consists of configuring the application associated with the digital tag to be launched into a non-visible state. In this state, the application can be running but would not be visible to a user. Step 435 can consist of configuring the application such that launch of the application can be in a full visible state on a user device (e.g. user device 200). This step can further consist of monitoring the time or stopping the time recording started by the background service when the user device receives the emitted tag by the background service (e.g. an Android® Broadcast Receiver). The time can be used as described to determine whether the application associated with the digital tag should be launched in a visible state.

Figure 5:
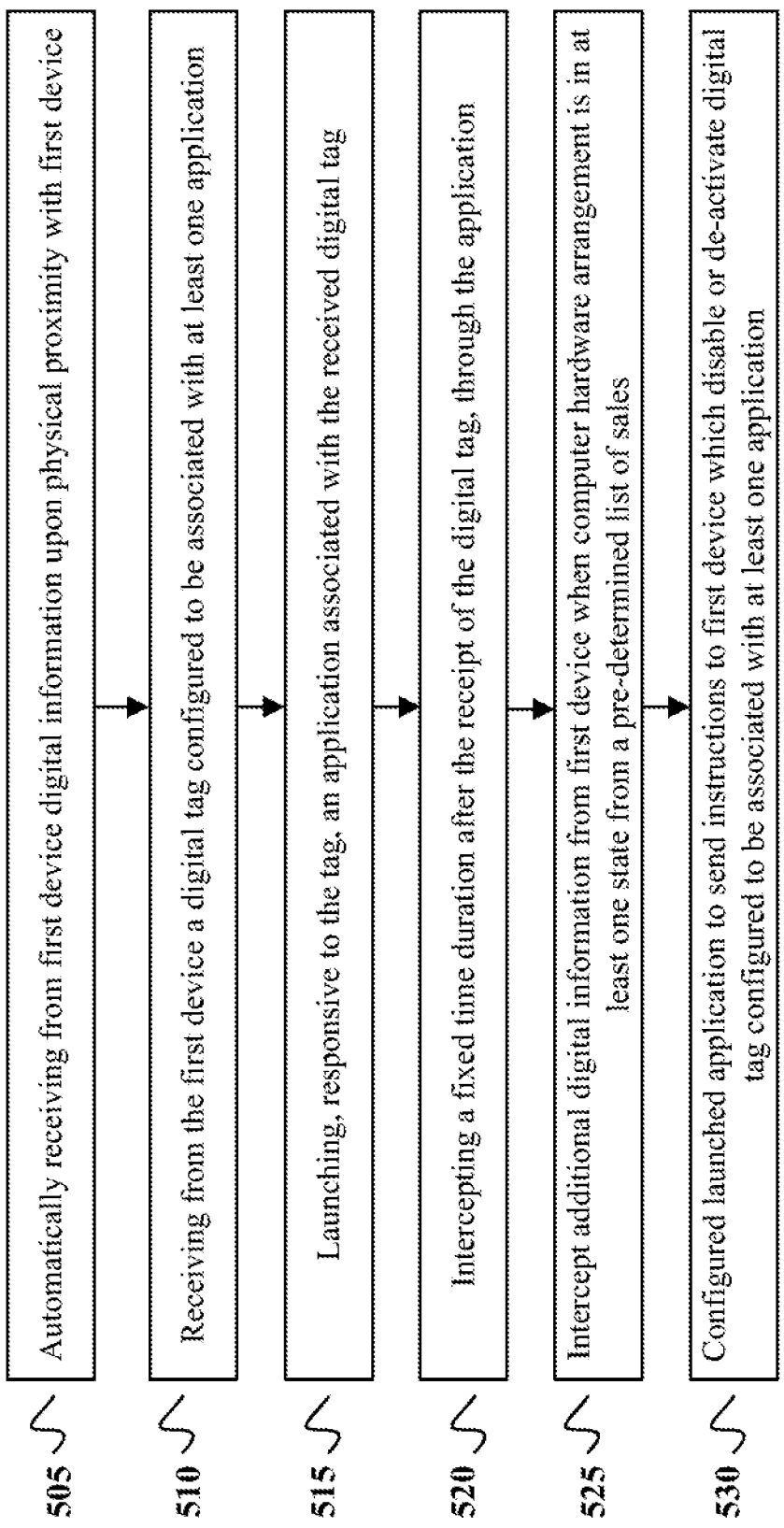
FIG. 5 is a flow diagram of a method for launching an application on a device and synchronizing counters according to an example embodiment of the present disclosure.

FIG. 5 describes an embodiment of the present invention, method 500. Method 500 starts at step 505, in which information is requested from a first device (e.g., first device 100) when a user device (e.g., user device 200) is in physical proximity to a first device. This can occur when user device 200 recognizes the presence of a first device through the overlap of communication fields of first device 100 and user device 200 overlap. This can also occur through software in user device 200 recognizing the presence of a communication field external to user device 200. In step 510, a digital tag is received from first device 100 (e.g. first device 100). This digital tag can be information which was not requested from first device 100. This digital tag can be platform or operating system specific. In some embodiments, this digital tag can be configured to be an AAR launch tag. In step 515, an application associated with the emitted digital tag can be launched responsive to the received tag. For example, on an Android® operating system, the launched application can be defined by meta-data or specialized fields in the received tag. The second device can, upon not finding the application specified in the emitted digital tag, launch a package manager or application manager, such as for example, the Google® Play Store, in order to identify and allow the user to download the specified application. In step 520, any additional tags received by the user device can further be intercepted. In step 525, any additional digital information received from the first device can be intercepted when a computer hardware arrangement (e.g. user device 200) is in a particular state. For example, if a cell phone has its screen on, it can then be considered to be in state amongst the list of pre-determined states. This can include for example one or more tags associated with, or sent subsequent to the first digital tag, that instructs the device receiving the tags to perform certain actions (e.g. launch an application) or otherwise delivers a payload to the second application. In step 530, the application launched in response to receipt of a digital tag from the first device can send instructions to the first device. These instructions can disable, overwrite, or de-activate one or more digital tags on the first device that are associated with at least one application.

Figure 6:
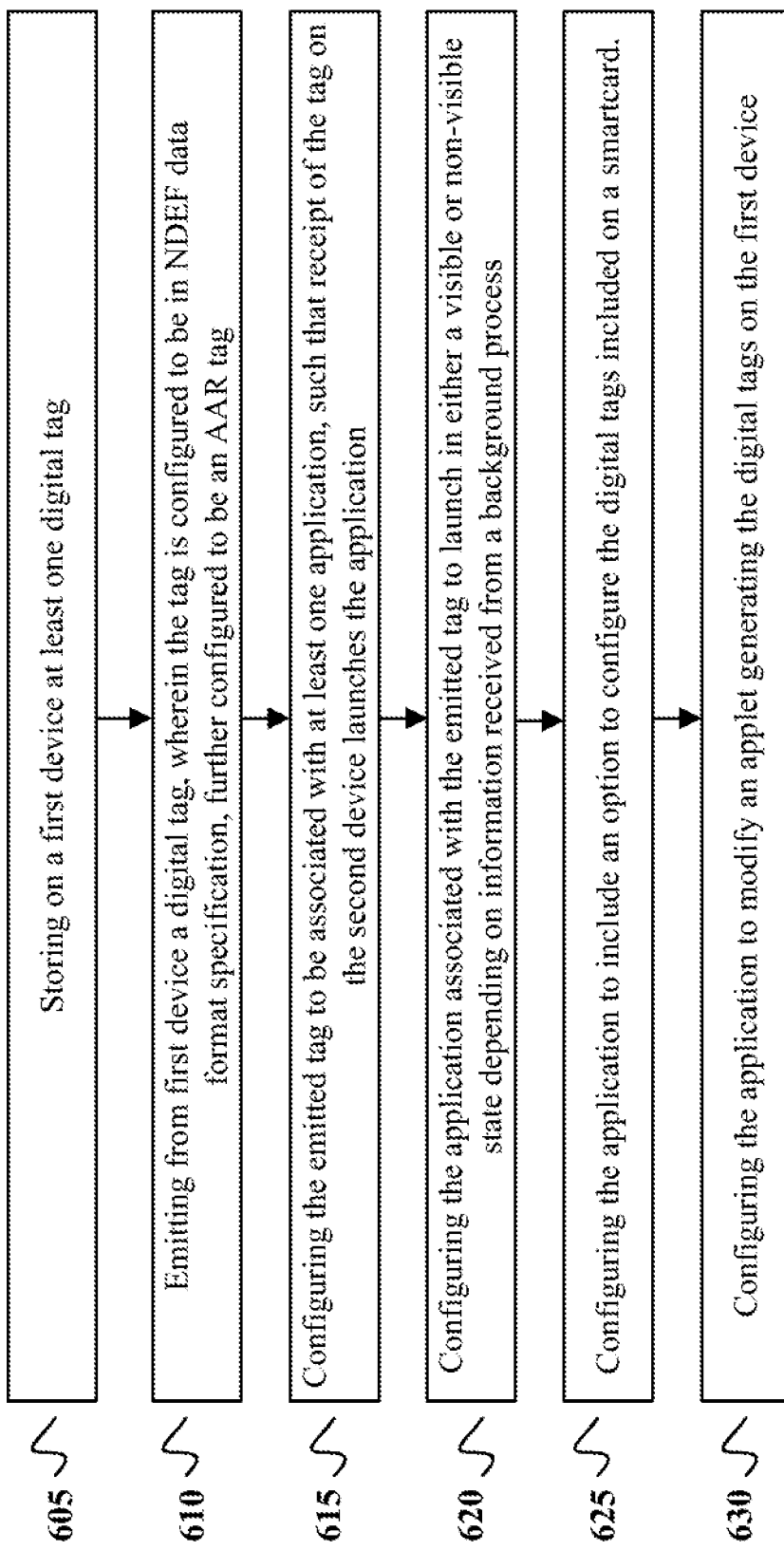
FIG. 6 is a flow diagram of a method for modifying digital tags of a smartcard according to an example embodiment of the present disclosure.

FIG. 6 describes an embodiment of the present invention, method 600. Method 600 can begin at step 605, in which at least one digital tag is stored on a first device (e.g., first device 100). An applet can also be stored on the first device, which can further be configured to generate a collection or a manifest of digital tags. These tags can be pre-generated, in which case, an applet can optionally not be used to generate the digital tags. The applet can also be modifiable or configurable, such as through the use of flags, which can indicate which digital tags the applet can generate. In step 610, a digital tag is emitted from the first device (e.g., first device 100). This can be emitted in response to an external trigger, such as an electromagnetic field, or first device 100 can be in a state of constant emission of the signal. This step can for example take the form of the NFC apparatus a first device (e.g. first device 100) being activated in the presence of an external field, such as a magnetic or electric field, from a second device (e.g. user device 200), inducing power within first device 100. The NFC apparatus can also be activated when the first device communication field (e.g., first device communication field 104) overlaps with another communication field, such as that belonging to a second device. In step 615, the tag emitted from the first device (e.g. first device 100) can be configured to be associated with one at least one application, and further be configured to cause the application to be launched on a second device (e.g. user device 200). This can be done by configuring the emitted tag to be in a particular data format, with a specific payload. For example, the digital tag can be configured to be in the NDEF data format specification, further configured to be an AAR launch tag. In step 620, the application associated with the emitted tag can be configured to only launch in either a visible or non-visible state depending on information received from a background process. This background process can for example be started whenever a second device (e.g. user device 200) is in a particular state, such as for example, the screen of the second device is on, the second device has received a user input, or the second device is unlocked, or the second device is turned on. In step 620, the application associated with the digital tag can launch, or caused to be launched, in a visible state. In this state, a user can interact with the application on a second device (e.g. user device 200). For example, a user can interact with the second device using the touchscreen of the second device. In step 625, the application can further be configured to include an option to configure the digital tags included on a smartcard (e.g. first device 100). As an example, a smartcard can contain a smartcard operating system, and further in its memory contain an applet which is configured to generate a digital tag. The smartcard can also contain a communication medium, such as an NFC medium. The application launched on a user device (e.g. user device 200) can then, based on the user input cause the user device to send commands to the smartcard to disable certain digital tags to be generated. In another example, the smartcard can contain a flag which can disable certain digital tags from being generated. Step 630 can consist of further configuring the application, once launched in a visible state, to modify the applet generating the digital tags on the first device. This modification can be made to modify the particular payloads of the digital tags which are generated on the first device.

Figure 7:
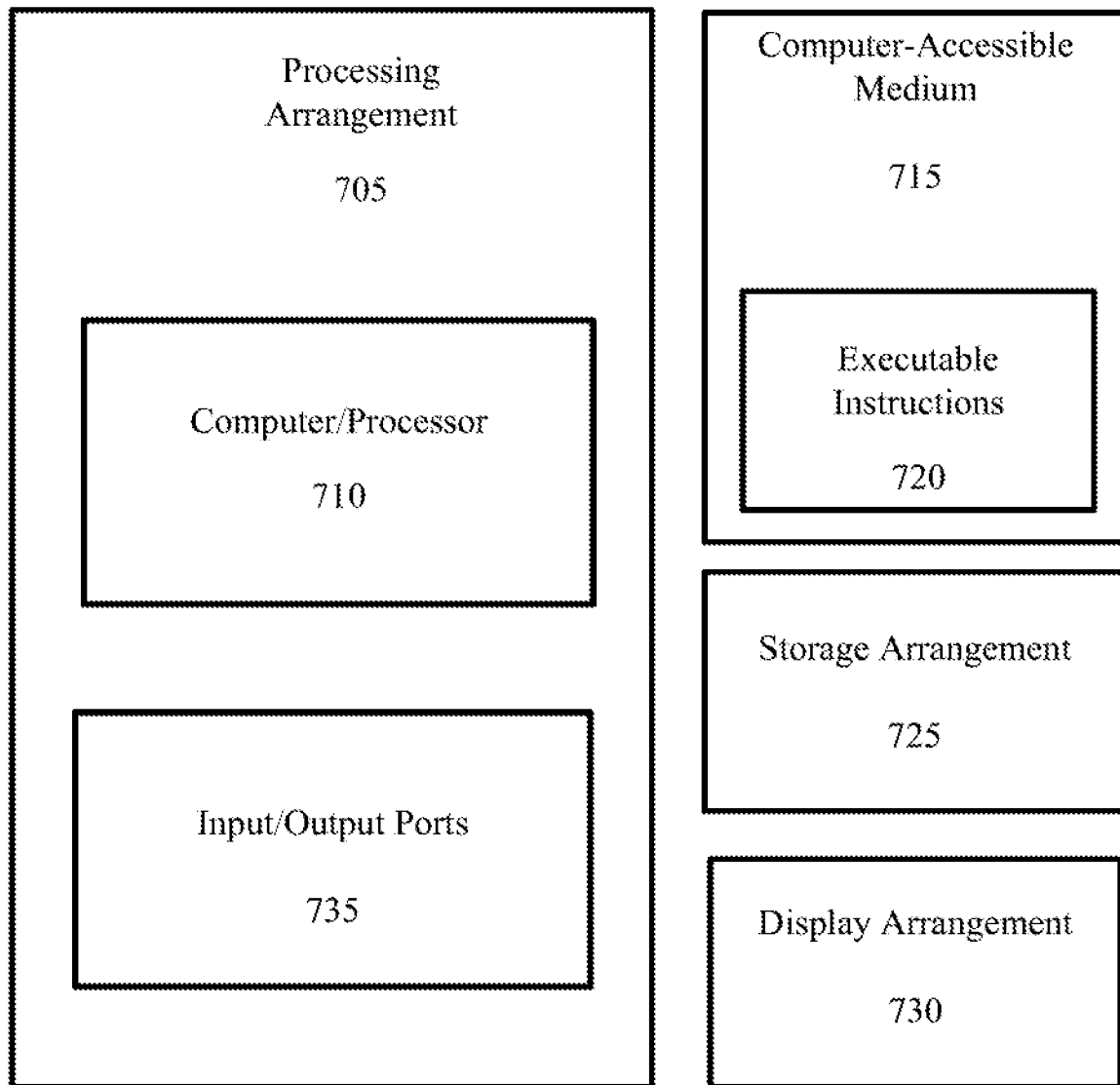
FIG. 7 is an illustration of a block diagram of an example system in accordance with example embodiments of the present disclosure.

FIG. 7 shows a block diagram of an exemplary embodiment of a system 700 according to the present disclosure, which can be used to perform the procedures described below. For example, exemplary procedures in accordance with the present disclosure described herein can be performed by a processing arrangement and/or a computing arrangement (e.g., computer hardware arrangement) 705. Such processing/computing arrangement 705 can be, for example entirely or a part of, or include, but not limited to, a computer/processor 710 that can include, for example one or more microprocessors, and use instructions stored on a computer-accessible medium (e.g., RAM, ROM, hard drive, or other storage device).

As shown in FIG. 7, for example a computer-accessible medium 715 (e.g., a storage device such as a hard disk, floppy disk, memory stick, CD-ROM, RAM, ROM, etc., or a collection thereof) can be provided (e.g., in communication with the processing arrangement 705). The computer-accessible medium 715 can contain executable instructions 720 thereon. In addition, or alternatively, a storage arrangement 725 can be provided separately from the computer-accessible medium 715, which can provide the instructions to the processing arrangement 705 so as to configure the processing arrangement to execute certain exemplary procedures, processes, and methods, as described herein above.

Further, the exemplary processing arrangement 705 can be provided with or include one or more input/output ports 735, which can include, for example a wired network, a wireless network, the internet, an intranet, a data collection probe, a sensor, etc. or any combination thereof. As shown in FIG. 7, the exemplary processing arrangement 705 can be in communication with an exemplary display arrangement 730, which, according to certain exemplary embodiments of the present disclosure, can be a touch-screen configured for inputting information to the processing arrangement in addition to outputting information from the processing arrangement, for example. Further, the exemplary display arrangement 730 and/or a storage arrangement 725 can be used to display and/or store data in a user-accessible format and/or user-readable format.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
a computer hardware arrangement configured to:
receive, from a transmitting device, a digital tag configured to be associated with an application;
launch, responsive to the digital tag, the application associated with the received digital tag;
record, through the application, a number of launches responsive to the digital tag; and
send, through the application, a notification to a server indicating the number of launches to synchronize a counter on the computer hardware arrangement with a counter on the server.

2. The system of claim 1, wherein the computer hardware arrangement is further configured to, when the application is not present on the computer hardware arrangement, install the application responsive to receiving the digital tag.

3. The system of claim 1, wherein the computer hardware arrangement is further configured to receive, from the transmitting device upon physical proximity with the first device and prior to receiving the digital tag, digital information.

4. The system of claim 1, wherein the computer hardware arrangement is further configured to intercept additional digital information from the transmitting device.

5. The system of claim 4, wherein the computer hardware arrangement is further configured to intercept additional digital information for a fixed time duration after the receipt of the digital tag.

6. The system of claim 4, wherein the computer hardware arrangement is further configured to intercept additional digital information through the application.

7. The system of claim 4, wherein the computer hardware arrangement is further configured to intercept additional digital information when the computer hardware arrangement is in at least one state from a pre-determined list of states.

8. The system of claim 7, wherein the predetermined list of states comprises a locked state, an unlocked state, a screen on state, and a screen off state.

9. The system of claim 4, wherein the computer hardware arrangement is further configured to store the additional digital information in a memory of the computer hardware arrangement.

10. The system of claim 1, wherein:
the device is a contactless card, and
the computer hardware arrangement is a smartphone.

11. A method, comprising:
launching, by an application on a device, responsive to receipt of a digital tag;
recording, by the application, a number of launches responsive to the digital tag; and
sending a notification to a server indicating the number of launches to synchronize a counter on the first device with a counter on the server.

12. The method of claim 11, wherein the application is configured to launch in when the device is in at least a first state from a pre-determined list of states.

13. The method of claim 11, further comprising intercepting, by the application, digital information for a fixed time duration after the receipt of the digital tag.

14. The method of claim 13, wherein the application is configured to intercept digital information when the device is in at least a second state from a pre-determined list of states.

15. The method of claim 13, further comprising storing, by the application, the additional digital information in a memory of the device.

16. A device, comprising:
a processor; and
a memory storing an application,
wherein, after receipt of a digital tag from a transmitting device, the application is configured to:
launch when the device is in at least a first state from a pre-determined list of states,
record a number of launches responsive to the digital tag, and
send a notification to a server indicating the number of launches to synchronize a counter on the transmitting device with a counter on the server.

17. The device of claim 16, wherein the application is further configured to intercept digital information from the transmitting device when the device is in at least a second state from a pre-determined list of states.

18. The device of claim 17, wherein the first state and the second state are the same.

19. The device of claim 17, wherein the application is further configured to intercept digital information from the transmitting device for a fixed time duration after the receipt of the digital tag.

20. The device of claim 17, wherein the application is further configured to:
transmit a modification to an applet of the transmitting device configured to generate the digital tag, and
the modification comprises at least one selected from the group of a change to a digital tag payload and disabling the generation of digital tags.

* * * * *